United States Patent
Nagy et al.

(10) Patent No.: US 10,589,751 B2
(45) Date of Patent: Mar. 17, 2020

(54) AUTONOMOUS MANEUVER NOTIFICATION FOR AUTONOMOUS VEHICLES

(71) Applicant: Robert Bosch GmbH, Stuttgart (DE)

(72) Inventors: Akos Nagy, Mountain View, CA (US); Shetty Rajaram, Bangalore (IN); Jeorg Vetter, Friesenheim (DE); Tatiana Mamaeva, Munich (DE); Christian Kremer, Grossheubach (DE); Jan Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 15/540,836

(22) PCT Filed: Dec. 31, 2015

(86) PCT No.: PCT/US2015/068335
§ 371 (c)(1),
(2) Date: Jun. 29, 2017

(87) PCT Pub. No.: WO2016/109829
PCT Pub. Date: Jul. 7, 2016

(65) Prior Publication Data
US 2017/0361853 A1    Dec. 21, 2017

Related U.S. Application Data (60) Provisional application No. 62/098,416, filed on Dec. 31, 2014.

(51) Int. Cl.
*B60W 50/14* (2020.01)
*B60W 30/18* (2012.01)
(Continued)

(52) U.S. Cl.
CPC ............ *B60W 50/14* (2013.01); *B60W 10/04* (2013.01); *B60W 10/18* (2013.01); *B60W 10/20* (2013.01);
(Continued)

(58) Field of Classification Search
CPC .... G05D 1/0055; G05D 1/0061; G05D 1/021; G05D 1/02; B60W 30/00; B60W 50/14;
(Continued)

(56) References Cited

U.S. PATENT DOCUMENTS

| | | |
|---|---|---|
| 6,363,322 B1 | 3/2002 | Millington |
| 8,346,426 B1 | 1/2013 | Szybalski et al. |

(Continued)

FOREIGN PATENT DOCUMENTS

| | | |
|---|---|---|
| CN | 101537835 A | 9/2009 |
| CN | 102639378 A | 8/2012 |

(Continued)

OTHER PUBLICATIONS

Office Action from the National Intellectual Property Administration, P.R. China for Application No. 201580077148.8 dated Dec. 3, 2018 (15 pages).

(Continued)

*Primary Examiner* — Behrang Badii
(74) *Attorney, Agent, or Firm* — Michael Best & Friedrich LLP (57) ABSTRACT

Systems and methods of operating an autonomous vehicle to perform an autonomous maneuver. One system includes a human machine interface and an electronic controller electrically coupled to the human machine interface. The electronic controller includes an electronic processor configured to detect at least one driving condition and determine the autonomous maneuver based on the at least one driving condition. The electronic processor is also configured to
(Continued)

display, via the human machine interface, a maneuver notification before performing the autonomous maneuver. The electronic processor is further configured to control the autonomous vehicle to perform the autonomous maneuver.

16 Claims, 5 Drawing Sheets

(51) Int. Cl.
| | |
|---|---|
| *B60W 10/18* | (2012.01) |
| *B60W 30/14* | (2006.01) |
| *B60W 30/09* | (2012.01) |
| *B60W 10/20* | (2006.01) |
| *B60W 10/04* | (2006.01) |
| *B60W 30/095* | (2012.01) |
| *G05D 1/02* | (2020.01) |

(52) U.S. Cl.
CPC .......... *B60W 30/09* (2013.01); *B60W 30/095* (2013.01); *B60W 30/14* (2013.01); *B60W 30/18163* (2013.01); *B60W 2050/146* (2013.01); *B60W 2540/04* (2013.01); *B60W 2550/10* (2013.01); *B60W 2550/30* (2013.01); *G05D 1/02* (2013.01); *G05D 1/021* (2013.01)

(58) Field of Classification Search
CPC .... B60W 50/08; B60W 50/087; B60W 30/16; B60W 30/12; B60W 50/16; B60W 30/18; B60W 30/143; B60W 10/04; B60W 10/18; B60W 10/20; B60W 30/09; B60W 30/095; B60W 30/14; B60W 30/18163; B60W 2050/146; B60W 2540/04; B60W 2550/10; B60W 2550/30; B60Q 1/503; B60Q 1/525; B60Q 5/006; B60Q 9/008; B60Q 1/08; B60K 28/06; B60K 35/00; B60K 37/06; G06K 9/00798; G06K 9/00805; G06K 9/00818; G06K 9/00825; G06K 9/209; G01C 21/367; G01C 21/3676; G01C 21/3658; G01C 21/26; G06T 11/001; G06T 11/20; G06T 7/20; G06F 3/017; G07C 5/008; G07C 5/085; G07C 5/0808; B60C 23/0408; H04N 7/18; H04N 7/183; H04N 5/2253; B60R 1/001; B60R 1/00; B60R 1/12; B60R 11/04; B60R 21/213; B60R 21/233; B60R 21/235; G08G 1/166; G08G 1/167; G08G 9/02; G08G 1/142; G08G 1/161; G08G 1/16; G08G 1/096791; G08G 1/0969; G08G 1/163; G08G 1/09; B60N 2/002; G01G 23/3728; G02B 27/01; H01Q 1/3233; H01Q 1/325; H04W 4/48; H04W 4/06; H04W 72/0446; H04W 74/0816; H04W 72/005; H04W 56/0035; H04W 4/46; H04W 4/027; H04J 3/1694; H04L 5/0091

See application file for complete search history.

(56) References Cited

U.S. PATENT DOCUMENTS

| | | | |
|---|---|---|---|
| 8,676,431 B1 | 3/2014 | Mariet et al. | |
| 8,872,644 B2 | 10/2014 | Tauchi et al. | |
| 8,884,782 B2* | 11/2014 | Rubin ...................... | G08G 9/02 340/905 |
| 8,892,310 B1 | 11/2014 | Palmer et al. | |
| 9,132,840 B1* | 9/2015 | Szybalski ............. | B60W 50/14 |
| 9,501,058 B1† | 11/2016 | Mariet | |
| 2007/0057781 A1* | 3/2007 | Breed ..................... | B60K 35/00 340/457.1 |
| 2008/0162027 A1 | 7/2008 | Murphy et al. | |
| 2010/0253540 A1 | 10/2010 | Seder et al. | |
| 2010/0253541 A1* | 10/2010 | Seder .................... | G01S 13/723 340/905 |
| 2010/0253918 A1† | 10/2010 | Seder et al. | |
| 2012/0182140 A1 | 7/2012 | Kumabe et al. | |
| 2013/0179023 A1* | 7/2013 | Schmidt ................ | G05D 1/021 701/23 |
| 2013/0229524 A1 | 9/2013 | Vovkushevsky et al. | |
| 2013/0321627 A1* | 12/2013 | Turn, Jr. ............... | B60W 30/00 348/148 |
| 2014/0015693 A1 | 1/2014 | Komoguchi et al. | |
| 2014/0244096 A1* | 8/2014 | An ....................... | G05D 1/0055 701/25 |
| 2015/0158469 A1† | 6/2015 | Cheatham, III et al. | |
| 2016/0167648 A1* | 6/2016 | James .................... | B60Q 1/503 701/28 |

FOREIGN PATENT DOCUMENTS

| | | |
|---|---|---|
| CN | 103328261 A | 9/2013 |
| DE | 102010051206 A1 | 5/2012 |
| DE | 102012007984 A1 | 3/2013 |
| EP | 1398684 A2 | 3/2004 |
| EP | 1990786 A1 | 11/2008 |
| GB | 2508687 A | 6/2014 |
| WO | 03080382 A1 | 10/2003 |

OTHER PUBLICATIONS

International Search Report and Written Opinion for Application No. PCT/US2015/068335 dated Apr. 1, 2016, (12 pages).
Examination Report from the European Patent Office for Application No. 15828729.2 dated Nov. 4, 2019 (5 pages).

\* cited by examiner
† cited by third party

AUTONOMOUS MANEUVER NOTIFICATION FOR AUTONOMOUS VEHICLES

RELATED APPLICATIONS

This application claims priority to U.S. Provisional Application No. 62/098,416, entitled "VEHICLE MANEUVER ANNOUNCEMENT FOR AUTOMATED VEHICLES," filed Dec. 31, 2014, the entire contents of which is incorporated herein by reference.

BACKGROUND

The disclosure relates to methods and systems for announcing autonomous maneuvers in an autonomous vehicle.

Driver assistance systems such as, for example, adaptive cruise control and automated lane change systems have been successfully deployed to the market to increase driver comfort and safety. As these driver assistance systems progress in sophistication, less driver interaction may be required. In some cases, the driver assistance systems may provide an autonomous driving mode for portions of a trip. Autonomous driving mode enables the vehicle to perform autonomous maneuvers without requiring a driver to steer, accelerate, or decelerate. Accordingly, the role of the driver has changed from that of an active driver to that of a passenger, for at least some portion of the trip. Drivers and passengers need to develop trust in autonomous vehicles. Thus, there is a need for drivers to be notified before autonomous maneuvers are performed by autonomous vehicles.

SUMMARY

One exemplary embodiment provides a system for operating an autonomous vehicle to perform an autonomous maneuver. The system includes a human machine interface and an electronic controller electrically coupled to the human machine interface. The electronic controller includes an electronic processor configured to detect at least one driving condition and determine the autonomous maneuver based on the at least one driving condition. The electronic processor is also configured to display, via the human machine interface, a maneuver notification before performing the autonomous maneuver. The electronic processor is further configured to control the autonomous vehicle to perform the autonomous maneuver.

Another embodiment provides a method of operating an autonomous vehicle to perform an autonomous maneuver. The method includes receiving, with an electronic processor of the autonomous vehicle, at least one driving condition. The method also includes determining, with the electronic processor, the autonomous maneuver based on the at least one driving condition. The method further includes displaying, with the electronic processor via a human machine interface of the autonomous vehicle, a maneuver notification before performing the autonomous maneuver. The method also includes controlling, with the electronic processor, the autonomous vehicle to perform the autonomous maneuver.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of other structural components may be utilized to implement the disclosure. It should also be noted that a plurality of hardware and software based devices, as well as a plurality of different structural components may be used to implement the disclosure. In addition, it should be understood that embodiments of the disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
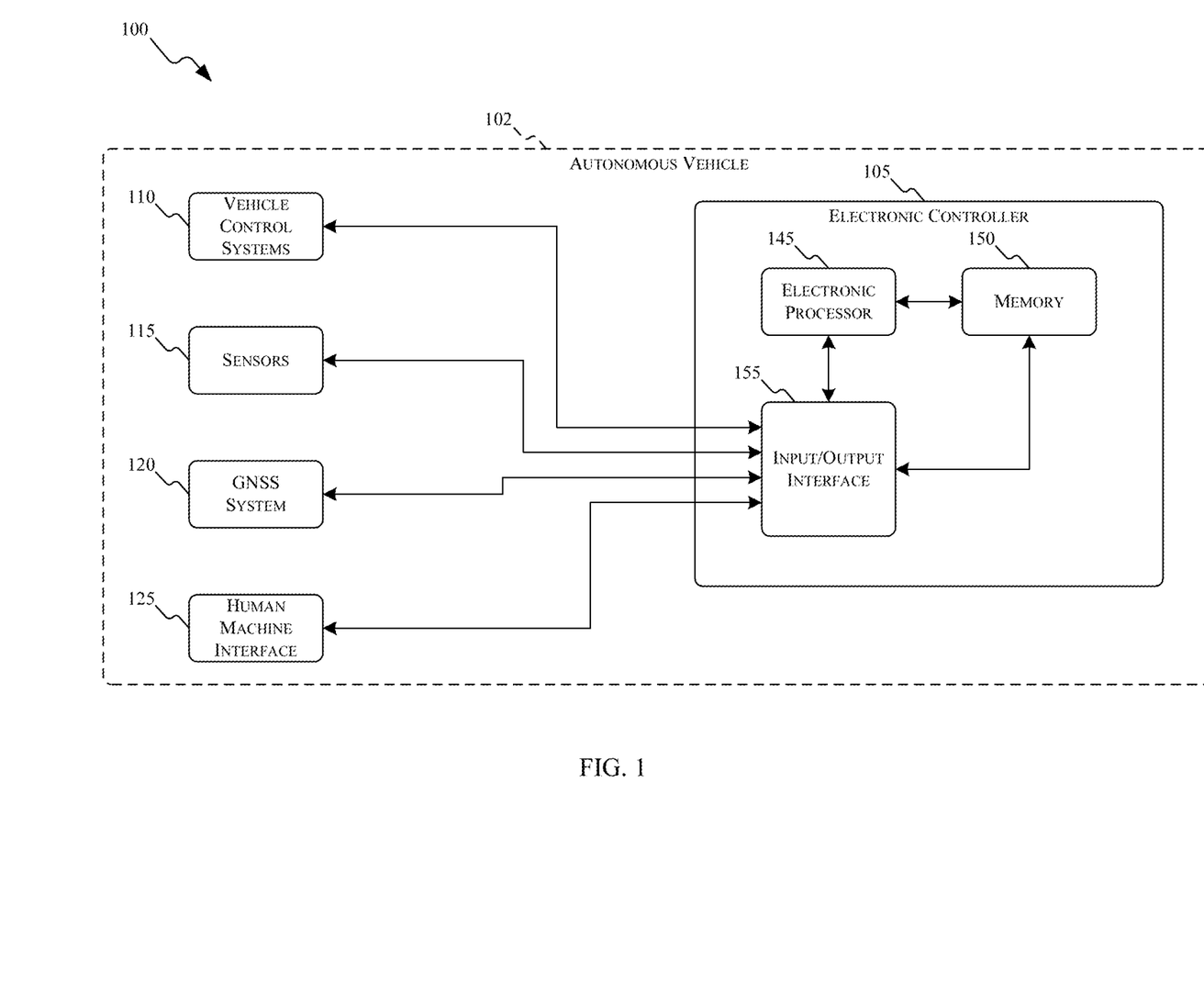
FIG. 1 is a block diagram of an autonomous vehicle control system in accordance with some embodiments.

FIG. 1 is a block diagram of one exemplary embodiment of an autonomous vehicle control system 100. As described more particularly below, the autonomous vehicle control system 100 may be mounted on or integrated into an autonomous vehicle 102 and autonomously drives the autonomous vehicle 102. It should be noted that, in the description that follows, the terms "vehicle," "autonomous vehicle," and "automated vehicle" should not be considered limiting. These term are used in a general way to refer to an autonomous or automated driving vehicle, which possesses varying degrees of automation (i.e., the vehicle is configured to drive itself with limited or, in some cases, no input from a driver). The systems and methods described herein may be used with any vehicle capable of operating partially or fully autonomously, being controlled manually by a driver, or some combination of both.

The term "driver," as used herein, generally refers to an occupant of an autonomous vehicle who is seated in the driver's position, operates the controls of the vehicle while in a manual mode, or provides control input to the vehicle to influence the autonomous operation of the vehicle. The term "passenger," as used herein, generally refers to an occupant of the autonomous vehicle 102 who passively rides in the autonomous vehicle 102 without controlling the driving operations of the autonomous vehicle 102. However, both the driver and passenger of the autonomous vehicle 102 may share some of the other's role. For example, the driver may hand over the driving controls to the autonomous vehicle control system 100 and ride in the autonomous vehicle 102 as a passenger for some or all of a trip.

The term "trip," as used herein, refers to the driving (manually or autonomously) of the autonomous vehicle 102 from a starting point to a final destination point, with or without one or more waypoints in between. For example, a trip may start at a driver's home (i.e., the starting point), include a stop to pick up a passenger at the passenger's home (i.e., a waypoint), and continue to the workplace of the driver and the passenger (i.e., the destination).

In the example illustrated, the autonomous vehicle control system 100 includes an electronic controller 105, vehicle control systems 110, sensors 115, a GNSS (global navigational satellite system) system 120, and a human machine interface (HMI) 125. The components of the autonomous vehicle control system 100 along with other various modules and components are electrically coupled to each other by or through one or more control or data buses, which enable communication therebetween. The use of control and data buses for the interconnection between and communication among the various modules and components would be known to a person skilled in the art in view of the disclosure described herein. In alternative embodiments, some or all of the components of the autonomous vehicle control system 100 may be communicatively coupled using suitable wireless modalities (e.g., Bluetooth™ or near field communication). For ease of description, the autonomous vehicle control system 100 illustrated in FIG. 1 includes one of each of the foregoing components. Alternative embodiments may include one or more of each component or may exclude or combine some components. The electronic controller 105 controls the vehicle control systems 110, the sensors 115, the GNSS system 120, and the human machine interface (HMI) 125 to autonomously control the autonomous vehicle 102 according to the methods described herein. In some embodiments, the electronic controller 105 controls the vehicle control systems 110, the sensors 115, the GNSS system 120, and the HMI 125 by transmitting control signals or instructions to these devices and systems.

The electronic controller 105 includes an electronic processor 145 (e.g., a microprocessor, application specific integrated circuit, etc.), a memory 150, and an input/output interface 155. The memory 150 may include non-transitory computer-readable media and, in some embodiments, includes at least a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 145 is coupled to the memory 150 and the input/output interface 155. The electronic processor 145 sends and receives information (e.g., from the memory 150 and/or the input/output interface 155), and processes the information by executing one or more software instructions or modules stored in the memory 150 or another non-transitory computer readable medium. The software can include firmware, one or more applications, program data, filters, rules, one or more program modules, and other executable instructions. The electronic processor 145 is configured to retrieve from the memory 150 and execute, among other things, software for autonomous vehicle control including the methods as described herein.

The input/output interface 155 transmits and receives information from devices external to the electronic controller 105 (e.g., over one or more wired and/or wireless connections), such as the vehicle control systems 110, the sensors 115, the GNSS system 120, and the HMI 125. The input/output interface 155 receives user input, provides system output, or a combination of both. As described herein, user input from a driver or passenger of the autonomous vehicle 102 may be provided via, for example, the HMI 125. The input/output interface 155 may also include other input and output mechanisms that for brevity are not described herein but which may be implemented in hardware, software, or a combination of both.

It should be understood that although FIG. 1 illustrates only a single electronic processor 145, memory 150, and input/output interface 155, alternative embodiments of the electronic controller 105 may include multiple electronic processors, memories, and/or input/output interfaces. It should also be noted that the autonomous vehicle control system 100 may include other electronic controllers, each including similar components as and configured similarly to the electronic controller 105. In some embodiments, the electronic controller 105 is implemented partially or entirely on a semiconductor (e.g., a field-programmable gate array ("FPGA") semiconductor) chip. Similarly, the various modules and controllers described herein may be implemented as individual controllers as illustrated or as components of a single controller. In some embodiments, a combination of approaches may be used.

The electronic processor 145 uses the input/output interface 155 to send and receive information or commands to and from the vehicle control systems 110 (e.g., over a vehicle communication bus, such as a controller area network (CAN) bus). The vehicle control systems 110 include components (e.g., actuators, motors, and controllers) to control the various vehicle control systems 110 (e.g., braking, steering, and engine power output). For the sake of brevity, the vehicle control systems 110 will not be described in greater detail. The electronic controller 105 controls the vehicle control systems 110 to autonomously drive the autonomous vehicle 102. In some embodiments, the electronic controller 105 controls the vehicle control systems 110 to automatically drive the autonomous vehicle 102 without driver intervention or input for the entirety of a trip. In other embodiments, the electronic controller 105 controls the vehicle control systems 110 to drive the autonomous vehicle 102 for a portion of a trip and to allow or require a driver to manually operate the autonomous vehicle 102 for one or more portions of the trip. In some embodiments, the electronic controller 105 controls one or more of the vehicle control systems 110 to perform autonomous maneuvers (e.g., lane changes, overtaking another vehicle, turning, turning at crossroads, merging into traffic at highways, and the like).

The sensors 115 are coupled to the electronic controller 105 and determine one or more attributes of the autonomous vehicle 102. The sensors 115 communicate information regarding those attributes to the electronic controller 105 using, for example, electrical signals. The vehicle attributes include, for example, the position of the autonomous vehicle 102 or portions or components of the autonomous vehicle 102, the movement of the autonomous vehicle 102 or portions or components of the autonomous vehicle 102, the forces acting on the autonomous vehicle 102 or portions or components of the autonomous vehicle 102, and the proximity of the autonomous vehicle 102 to other vehicles or objects (stationary or moving). The sensors 115 may include, for example, vehicle control sensors (e.g., sensors that detect accelerator pedal position, brake pedal position, and steering wheel position (steering angle)), wheel speed sensors, vehicle speed sensors, yaw sensors, force sensors, odometry sensors, and vehicle proximity sensors (e.g., camera, radar, ultrasonic). The electronic controller 105 receives and interprets the signals received from the sensors 115 to determine values for the various vehicle attributes, including, for example, vehicle speed, steering angle, vehicle position, pitch, yaw, and roll. The electronic controller 105 controls the vehicle control systems 110 to autonomously control the autonomous vehicle 102 (for example, by generating braking signals, acceleration signals, steering signals) based at least in part on the information received from the sensors 115. Some of the sensors 115 may be integrated into the vehicle control systems 110. Alternatively or in addition, some of the sensors 115 may be deployed on the autonomous vehicle 102 separately from the vehicle control systems 110. In some embodiments, the electronic controller 105 detects driving conditions (e.g., obstructions on the road, approaching an intersection, ending lanes, merging points, and the like) based at least in part on the information received from the sensors 115.

The GNSS (global navigation satellite system) system 120 receives radio-frequency signals from orbiting satellites using one or more antennas and receivers (not shown). The GNSS system 120 determines geo-spatial positioning (i.e., latitude, longitude, altitude, and speed) for the autonomous vehicle 102 based on the received radio-frequency signals. The GNSS system 120 communicates this positioning information to the electronic controller 105. The electronic controller 105 may use this information in conjunction with or in place of information received from the sensors 115 when autonomously controlling the autonomous vehicle 102. The electronic controller 105 may also control the GNSS system 120 to plan routes and navigate the autonomous vehicle 102. GNSS systems are known, and will not be described in greater detail. In some embodiments, the GNSS system 120 may operate using the GPS (global positioning system). Alternative embodiments may use a regional satellite navigation system, and/or a land-based navigation system in conjunction with or in place of the GNSS system 120.

The human machine interface (HMI) 125 provides an interface between the autonomous vehicle control system 100 and the driver. The HMI 125 is electrically coupled to the electronic controller 105 and receives input from the driver (e.g., driver input), receives information from the electronic controller 105, and provides feedback (e.g., audio, visual, haptic, or a combination thereof) to the driver based on the received information. The HMI 125 provides suitable input mechanisms, such as a button, a touch-screen display having menu options, voice recognition, etc., for receiving inputs from the driver that may be used by the electronic controller 105 to control the autonomous vehicle 102.

The HMI 125 provides visual output such as, for example, graphical indicators (i.e., fixed or animated icons), lights, colors, text, images, combinations of the foregoing, and the like. The HMI 125 includes a suitable display mechanism for displaying the visual output, for example, an instrument cluster, a mirror, a heads-up display, a center console display screen (for example, a liquid crystal display (LCD) touchscreen, or an organic light-emitting diode (OLED) touchscreen), or other suitable mechanisms. In alternative embodiments, the display screen may not be a touch screen. In some embodiments, the HMI 125 displays a graphical user interface (GUI) (for example, generated by the electronic processor 145 from instructions and data stored in the memory 150 and presented on the display screen) that enables a user to interact with the autonomous vehicle control system 100. The HMI 125 may also provide audio output to the driver such as a chime, buzzer, voice output, or other suitable sound through a speaker included in the HMI 125 or separate from the HMI 125. In some embodiments, the HMI 125 provides haptic outputs to the driver by vibrating one or more vehicle components (e.g., the vehicle's steering wheel and the driver's seat), such as through the use of a vibration motor. In some embodiments, the HMI 125 provides a combination of visual, audio, and haptic outputs.

Prior to performing an autonomous maneuver (e.g., lane changes, overtaking another vehicle, turning, turning at crossroads, merging into traffic at highways, and the like) the electronic controller 105 generates and displays a maneuver notification 200 using the HMI 125. Proactive announcement of the autonomous maneuver to the driver before executing the actual autonomous maneuver increases the trust of the driver in the capabilities of the autonomous vehicle control system 100. As described in greater detail below, the maneuver notification 200 indicates, among other things, the autonomous maneuver which the autonomous vehicle 102 will perform as a result of a detected driving condition. FIGS. 2A-2D illustrate exemplary embodiments of maneuver notifications 200 in which the driving condition is a slower vehicle blocking the lane in front of the autonomous vehicle 102 and the autonomous maneuver is a lane change into a left lane. These examples should not be considered limiting. Skilled artisans will appreciate that the concepts embodied in the examples described below may be applied to any type of autonomous maneuver and in response to various detected driving conditions.

Figure 2A:
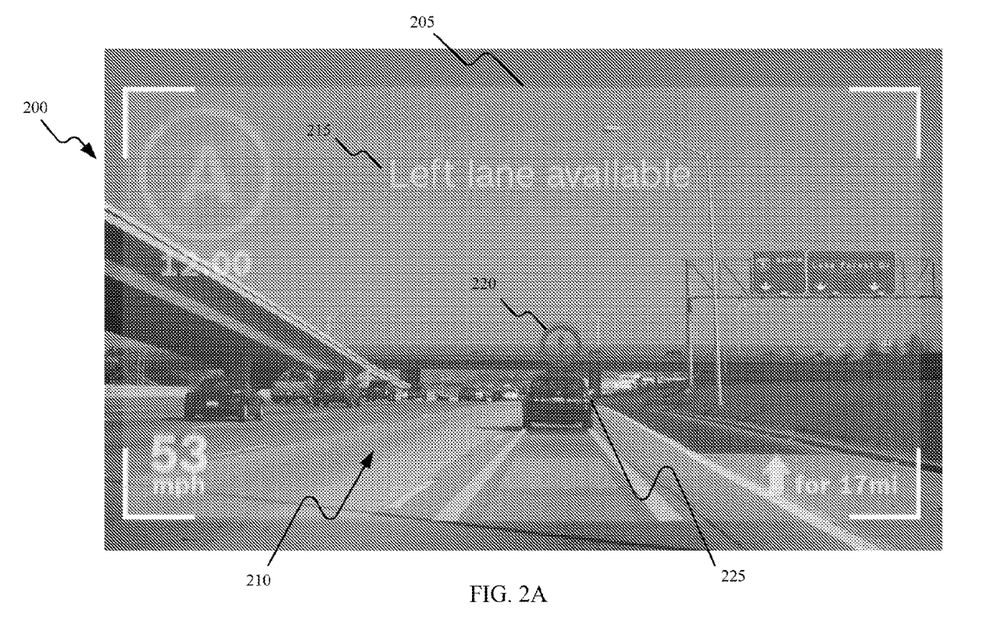
FIGS. 2A-2D illustrate exemplary embodiments of maneuver notifications in accordance with some embodiments.

FIG. 2A illustrates an exemplary embodiment of the maneuver notification 200 that may be generated and displayed on a heads-up display (HUD) 205 (e.g., projected on a windshield of the autonomous vehicle 102) by the electronic controller 105 using the HMI 125. The maneuver notification 200 illustrated in FIG. 2A includes a maneuver indicator 210, a descriptor 215, and a driving condition indicator 220. The maneuver indicator 210 illustrated in FIG. 2A is a highlighting of the left lane to indicate that the autonomous maneuver is a lane change into the left lane. The descriptor 215 illustrated in FIG. 2A includes text indicating that the autonomous maneuver is a lane change into the left lane. In other embodiments, the descriptor 215 includes an icon or graphic indicating that the autonomous maneuver is a lane change into the left lane. The driving condition indicator 220 indicates a detected driving condition. For example, the driving condition indicator 220 illustrated in FIG. 2A is an icon that is displayed over a slower moving vehicle 225 to indicate that the driving condition is an obstruction (e.g., the slower moving vehicle 225) positioned in front of the autonomous vehicle 102 and blocking the lane ahead.

Figure 2B:
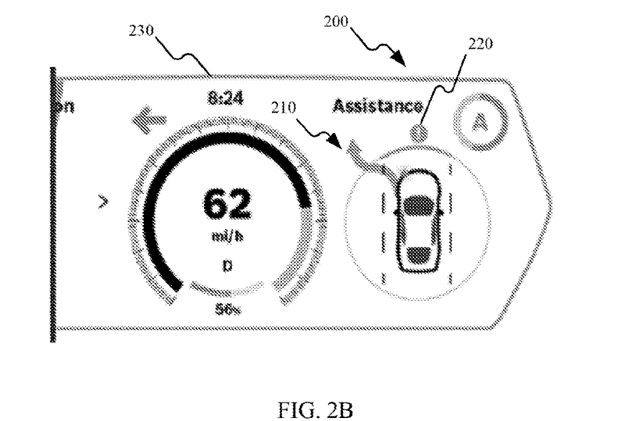

FIG. 2B illustrates another exemplary embodiment of the maneuver notification 200 that may be generated and displayed on a screen 230 (e.g., in an instrument cluster screen of the autonomous vehicle 102) by the electronic controller 105 using the HMI 125. The maneuver notification 200 illustrated in FIG. 2B includes the maneuver indicator 210 and the driving condition indicator 220. In some embodiments, the maneuver indicator 210 is a graphic depicting the autonomous maneuver. The maneuver indicator 210 illustrated in FIG. 2B is a graphic including a vehicle image and an arrow indicating a turning direction. The arrow illustrated in FIG. 2B points in the direction of the left lane to indicate that the autonomous maneuver is a lane change into the left lane. The driving condition indicator 220 illustrated in FIG. 2B is an icon that is positioned above the vehicle image to indicate that the driving condition is an obstruction (e.g., the slower moving vehicle 225) positioned in front of the autonomous vehicle 102 and blocking the lane ahead.

Figure 2C:
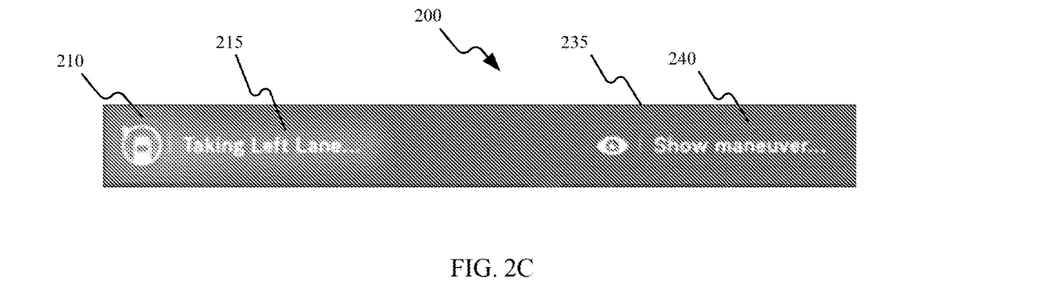

FIG. 2C illustrates another exemplary embodiment of the maneuver notification 200 that may be generated and displayed on a touch-screen 235 (e.g., in a center console of the autonomous vehicle 102) by the electronic controller 105 using the HMI 125. The maneuver notification 200 illustrated in FIG. 2C includes the maneuver indicator 210 and the descriptor 215. The maneuver indicator 210 illustrated in FIG. 2C is graphic including a vehicle image and an arrow pointing in the direction of the left lane to indicate that the autonomous maneuver is a lane change into the left lane. The descriptor 215 illustrated in FIG. 2C includes text indicating that the autonomous maneuver is a lane change into the left lane.

In some embodiments, the electronic controller 105 prompts a user (e.g., the driver) for a driver input while the maneuver notification 200 is displayed. For example, the maneuver notification 200 illustrated in FIG. 2C includes a display maneuver button 240. The display maneuver button 240 is a selectable button. In some embodiments, the display maneuver button 240 is selected when force is applied within an area of the touch-screen 235 defined by the display maneuver button 240. In other embodiments, the display maneuver button 240 is a mechanical button. Also, in some embodiments, the display maneuver button 240 can be combined with or replaced with a different selection mechanism, such as a slidable button, a rotating button, a swipe area, and the like. The electronic controller 105 receives a driver input from the HMI 125 when the display maneuver button 240 is selected (e.g., by the driver) while the maneuver notification 200 is displayed. As will be discussed below in further detail, the driver input indicates a request for additional information about the autonomous maneuver that will be performed.

Figure 2D:
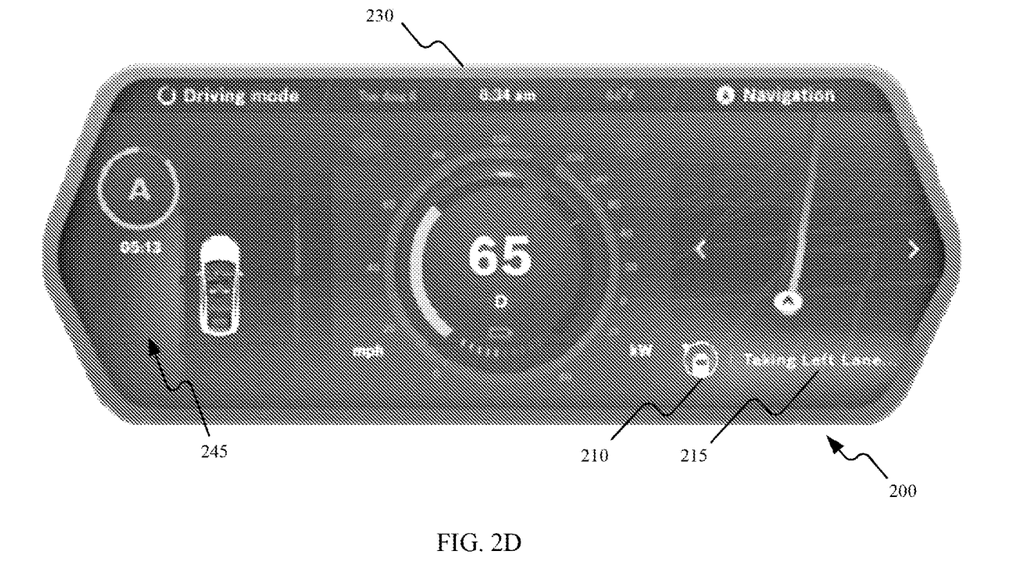

FIG. 2D illustrates another exemplary embodiment of the maneuver notification 200 that may be generated and displayed on the screen 230 (e.g., an instrument cluster screen of the autonomous vehicle 102) by the electronic controller 105 using the HMI 125. The maneuver notification 200 illustrated in FIG. 2D includes the maneuver indicator 210 and the descriptor 215. The maneuver indicator 210 illustrated in FIG. 2D is a graphic including a vehicle image and an arrow pointing in the direction of the left lane to indicate that the autonomous maneuver is a lane change into the left lane. The descriptor 215 illustrated in FIG. 2D includes text indicating that the autonomous maneuver is a lane change into the left lane. In some embodiments, as illustrated in FIG. 2D, the maneuver notification 200 may further include a second maneuver indicator 245. The second maneuver indicator 245 illustrated in FIG. 2D is a highlighting of the left lane to indicate that the autonomous maneuver is a lane change into the left lane.

As discussed above, the electronic controller 105 can receive driver input while the maneuver notification 200 is displayed indicating a request for additional information about the autonomous maneuver that will be performed. In response to receiving the driver input, the electronic controller 105 generates and displays an overhead view 300 using the HMI 125. The overhead view 300 increases the trust of the driver in the capabilities of the autonomous vehicle control system 100 by providing additional information about the autonomous maneuver and driving conditions. The overhead view 300 includes visual representations of the autonomous vehicle's position on the road and the autonomous maneuver that will be performed. In some embodiment, the overhead view 300 also includes visual representations of the positions (and types) of objects detected around the autonomous vehicle 102. For example, the overhead view 300 may include visual representations (e.g., vehicle graphics) of the positions of vehicles located around the autonomous vehicle 102 (as detected by the electronic controller 105).

In some embodiments, the overhead view 300 is a static image and includes the positions of the autonomous vehicle 102 and objects located around the autonomous vehicle 102 detected by the electronic controller 105 when the driver input is received. In other embodiments, the electronic controller 105 continuously or periodically changes or updates the overhead view 300 as the detected positions of the autonomous vehicle 102 and the objects located around the autonomous vehicle 102 change over time. In some embodiments, the electronic controller 105 continuously generates and displays the overhead view 300 using the HMI 125 until a time after the autonomous maneuver has been performed. In other embodiments, the electronic controller 105 continuously generates and displays the overhead view 300 using the HMI 125 until a time before the autonomous maneuver is performed. In other embodiments, the electronic controller 105 continuously generates and displays the overhead view 300 using the HMI 125 for a predetermined amount of time.

Figure 3A:
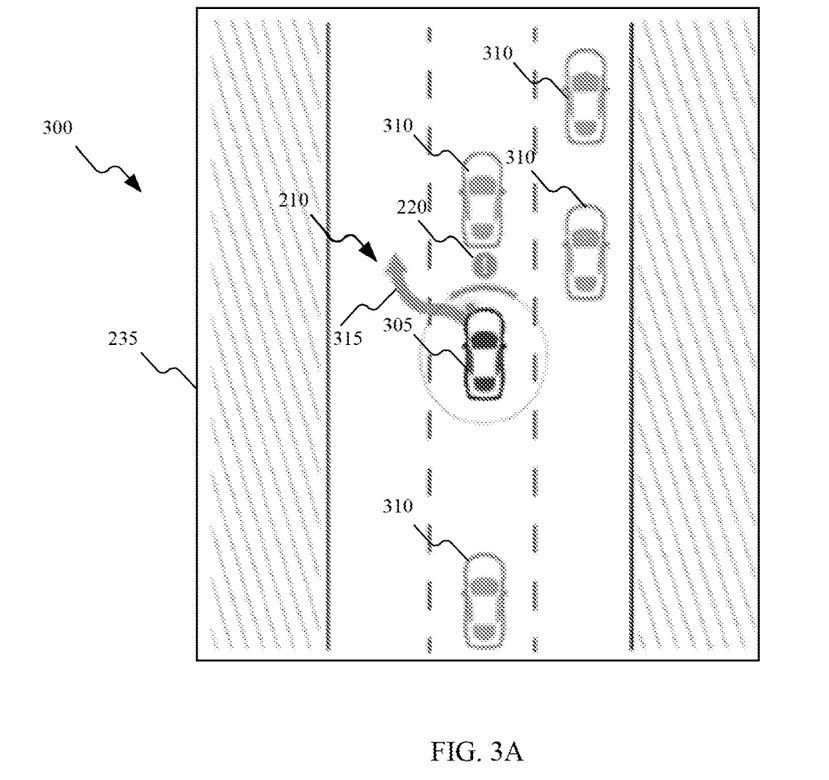
FIGS. 3A and 3B illustrate exemplary embodiments of overhead views in accordance with some embodiments.

FIG. 3A illustrates an exemplary embodiment of an overhead view 300 that may be generated and displayed on the touch-screen 235 (e.g., in a center console of the autonomous vehicle 102) by the electronic controller 105 using the HMI 125. The overhead view 300 illustrated in FIG. 3A includes a first vehicle graphic 305 indicating the position of the autonomous vehicle 102 and a plurality of second vehicle graphics 310 indicating the positions other vehicles located around the autonomous vehicle 102 (as detected by the electronic controller 105). The overhead view 300 illustrated in FIG. 3A also includes the maneuver indicator 210 and the driving condition indicator 220. The maneuver indicator 210 illustrated in FIG. 3A is the first vehicle graphic 305 and an arrow 315 pointing in the direction of the left lane to indicate that the autonomous maneuver is a lane change into the left lane. The driving condition indicator 220 illustrated in FIG. 3A is an icon that is positioned above the first vehicle graphic 305 to indicate that the driving condition includes an obstruction (e.g., a slow moving vehicle) that is positioned in front of the autonomous vehicle 102.

Figure 3B:
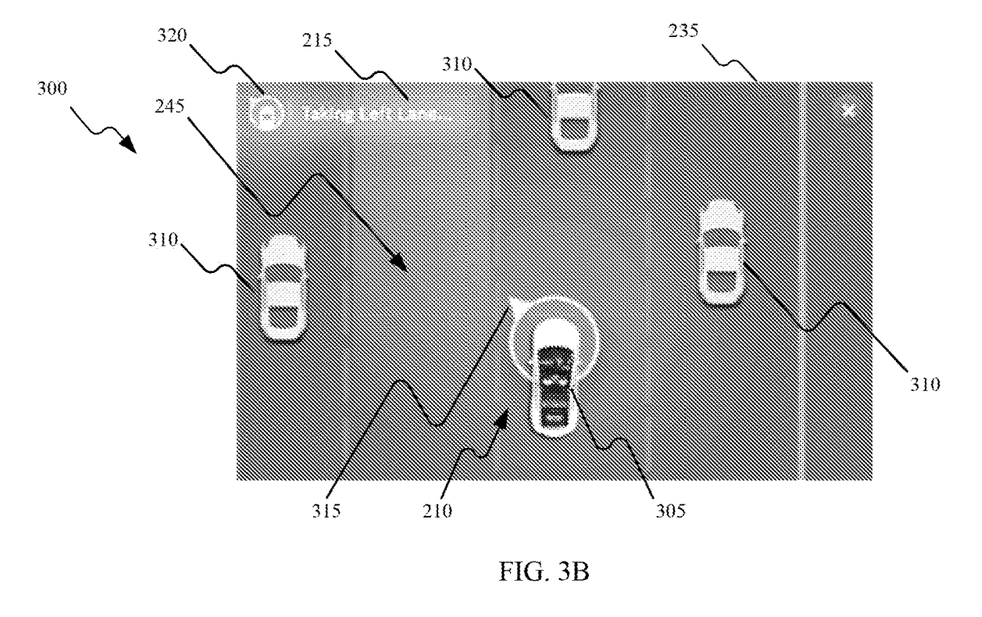

FIG. 3B illustrates another exemplary embodiment of the overhead view 300 that may be generated and displayed on the touch-screen 235 (e.g., in a center console of the autonomous vehicle 102) by the electronic controller 105 using the HMI 125. The overhead view 300 illustrated in FIG. 3B includes a first vehicle graphic 305 indicating the position of the autonomous vehicle 102 and a plurality of second vehicle graphics 310 indicating the positions other vehicles located around the autonomous vehicle 102 (as detected by the electronic controller 105). The overhead view 300 illustrated in FIG. 3B also includes the maneuver indicator 210 and the descriptor 215. The maneuver indicator 210 illustrated in FIG. 3B is the first vehicle graphic 305 and the arrow 315 pointing in the direction of the left lane to indicate that the autonomous maneuver is a lane change into the left lane. The descriptor 215 illustrated in FIG. 3B includes text which indicates that the autonomous maneuver is a lane change into the left lane.

In some embodiments, as illustrated in FIG. 3B, the overhead view 300 may further include the second maneuver indicator 245. The second maneuver indicator 245 illustrated in FIG. 3B is a highlighting of the left lane to indicate that the autonomous maneuver is a lane change into the left lane. In some embodiments, as illustrated in FIG. 3B, the overhead view 300 may further include the third maneuver indicator 320. The third maneuver indicator 320 illustrated in FIG. 3B is a graphic including a vehicle image and an arrow pointing in the direction of the left lane to indicate that the autonomous maneuver is a lane change into the left lane.

FIGS. 3A and 3B illustrate exemplary embodiments of overhead views 300 in which the driving condition is a slower vehicle blocking the lane in front of the autonomous vehicle 102 and the autonomous maneuver is a lane change into a left lane. These examples should not be considered limiting. Skilled artisans will appreciate that the concepts embodied in the examples described above may be applied to any type of autonomous maneuver and in response to various detected driving conditions.

Figure 4:
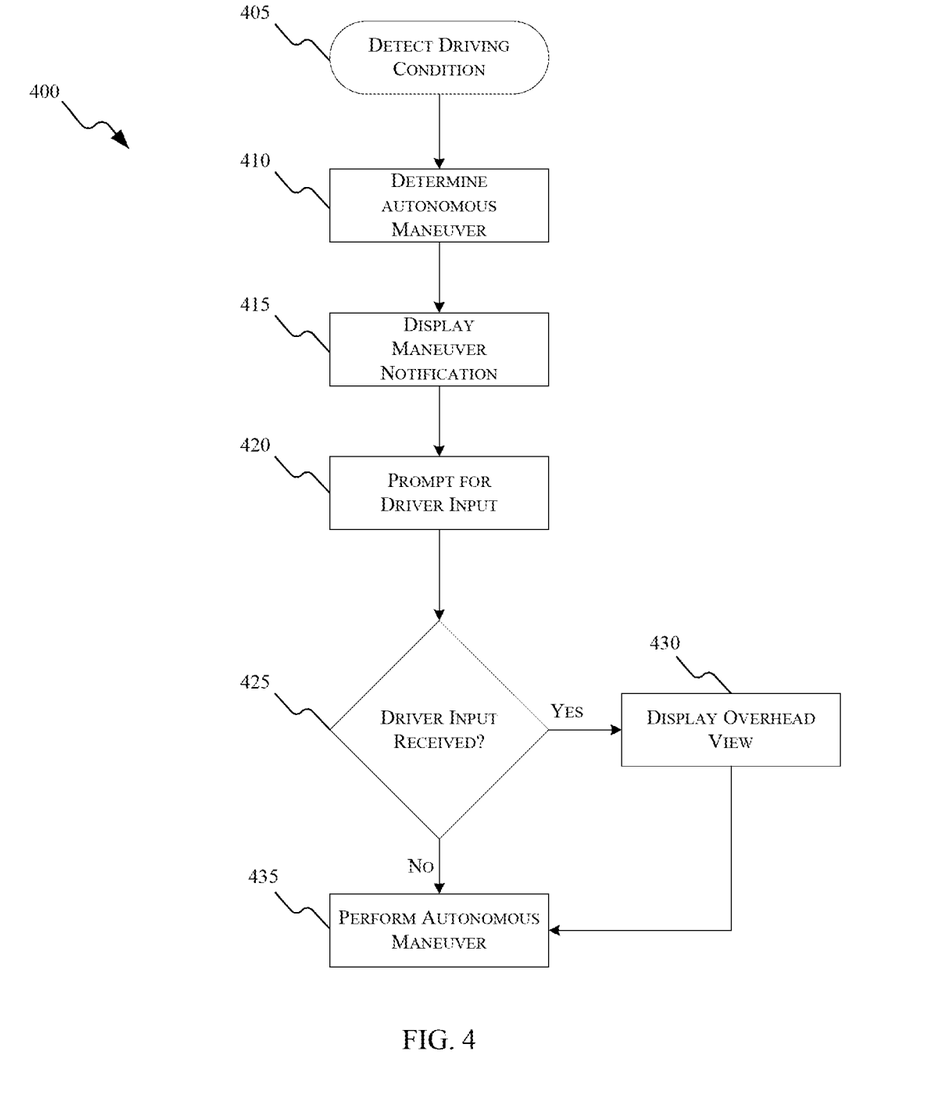
FIG. 4 is a flowchart of an exemplary method of operating an autonomous vehicle to perform an autonomous maneuver in accordance with some embodiments.

FIG. 4 illustrates one exemplary method 400 of operating the autonomous vehicle 102 to perform an autonomous maneuver. As an example, the method 400 is described in terms of the autonomous vehicle 102 performing a lane change (e.g., while driving on a freeway) while operating in autonomous driving mode. This example should not be considered limiting. Skilled artisans will appreciate that the concepts embodied in the example described may be applied to any autonomous maneuver performed by the autonomous vehicle 102.

As illustrated in FIG. 4, the electronic controller 105 detects at least one driving condition (e.g., block 405). In some embodiments, the electronic controller 105 detects driving conditions based on information received from one or more of the sensors 115. For example, the autonomous vehicle 102 may be traveling on a freeway, and the sensors 115 may detect the slower moving vehicle 225 positioned in front of the autonomous vehicle 102. In other embodiments, the electronic controller 105 may detect driving conditions based on information received from the GNSS system 120, the driver, an external device or systems, or a combination thereof. For example, in some embodiments, the electronic controller 105 may receive traffic information from the GNSS system 120 that indicates an upcoming obstruction, an upcoming change in permitted speed, a detour, and the like. Again, it should be understood that although the detected driving conditions discussed with respect to FIG. 4 include a slower moving vehicle 225 and lane occupation, other types of driving conditions may be detected.

The electronic controller 105 determines the autonomous maneuver based on the one or more detected driving conditions (at block 410). For example, when the electronic controller 105 detects the slower moving vehicle 225 and detects that the left lane is available (e.g., based on information received from the sensors 115), the electronic controller 105 may determine that turning the autonomous vehicle 102 into the left lane will avoid the slower moving vehicle 225 positioned in front of the autonomous vehicle 102.

Based on the determined autonomous maneuver, the electronic controller 105 generates and displays the maneuver notification 200 using the HMI 125 (see, e.g., FIG. 2A) (at block 415). The maneuver notification 200 is displayed before the autonomous vehicle 102 performs the autonomous maneuver. In some embodiments, the electronic controller 105 prompts for one or more driver inputs (e.g., using the HMI 125) while displaying the maneuver notification 200 (see, e.g., FIG. 2C) (at block 420). In some embodiments, a driver input may be a driver request to view the overhead view 300.

The electronic controller 105 determines whether the driver input is received (at block 425). When the electronic controller 105 receives the driver input (e.g., from the HMI 125), the electronic controller 105 generates and displays the overhead view 300 using the HMI 125 (see, e.g., FIG. 3A) (at block 430). The electronic controller 105 controls at least one of the vehicle control systems 110 to perform the autonomous maneuver (at block 435). In some embodiments, when the electronic controller 105 receives the driver input, the electronic controller 105 continues to generate and display the overhead view 300 using the HMI 125 while the autonomous maneuver is performed.

When the electronic controller 105 does not receive the driver input (e.g., from the HMI 125), the electronic controller 105 controls at least one of the vehicle control systems 110 to perform the autonomous maneuver without displaying the overhead view 300 (at block 435). In some embodiments, when the electronic controller 105 does not receive the driver input, the electronic controller 105 continues to generate and display the maneuver notification 200 using the HMI 125 while the autonomous maneuver is performed.

Thus, the disclosure provides, among other things, systems and methods of operating autonomous vehicles to perform autonomous maneuvers. Various features and advantages of the disclosure are set forth in the following claims.

What is claimed is:

1. A system for operating a vehicle to perform an autonomous maneuver, the system comprising:
   a human machine interface; and
   an electronic controller electrically coupled to the human machine interface, the electronic controller including an electronic processor configured to:
   detect at least one driving condition associated with another vehicle,
   determine the autonomous maneuver based on the at least one driving condition,
   display, via the human machine interface, a maneuver notification before performing the autonomous maneuver;

prompt, via the human machine interface, for a driver input in response to displaying the maneuver notification, wherein the driver input indicates a request for additional information about the autonomous maneuver;

receive, via the human machine interface, the driver input in response to displaying the maneuver notification;

display, via the human machine interface, an overhead view in response to receiving the driver input; and control the vehicle to perform the autonomous maneuver, wherein the overhead view includes a first vehicle graphic indicating a position of the vehicle on a roadway, and a plurality of secondary vehicle graphics indicating positions of every other vehicle located around the vehicle on the roadway.

2. The system of claim 1, wherein the maneuver notification includes a maneuver indicator based on the autonomous maneuver.

3. The system of claim 2, wherein the maneuver indicator includes a graphic depicting the autonomous maneuver.

4. The system of claim 3, wherein the graphic includes a vehicle image and an arrow indicating a turning direction.

5. The system of claim 2, wherein the maneuver notification further includes a driving condition indicator based on the at least one driving condition.

6. The system of claim 2, wherein the maneuver notification further includes a descriptor based on the autonomous maneuver.

7. The system of claim 1, wherein the autonomous maneuver includes a lane change.

8. The system of claim 1, further comprising:

at least one vehicle control system electrically coupled to the electronic controller, wherein the electronic processor is further configured to control the at least one vehicle control system to perform the autonomous maneuver.

9. A method of operating a vehicle to perform an autonomous maneuver, the method comprising:

detecting, with an electronic processor of the vehicle, at least one driving condition associated with another vehicle;

determining, with the electronic processor, the autonomous maneuver based on the at least one driving condition;

displaying, with the electronic processor via a human machine interface of the vehicle, a maneuver notification before performing the autonomous maneuver;

prompting, with the electronic processor via the human machine interface, for a driver input in response to displaying the maneuver notification, wherein the driver input indicates a request for additional information about the autonomous maneuver;

receiving, with the electronic processor via the human machine interface, the driver input in response to displaying the maneuver notification;

displaying, with the electronic processor via the human machine interface, an overhead view in response to receiving the driver input; and controlling, with the electronic processor, the vehicle to perform the autonomous maneuver, wherein the overhead view includes a first vehicle graphic indicating a position of the vehicle on a roadway, and a plurality of secondary vehicle graphics indicating positions of every other vehicle located around the vehicle on the roadway.

10. The method of claim 9, wherein the maneuver notification includes a maneuver indicator based on the autonomous maneuver.

11. The method of claim 10, wherein the maneuver indicator includes a graphic depicting the autonomous maneuver.

12. The method of claim 11, wherein the graphic includes a vehicle image and an arrow indicating a turning direction.

13. The method of claim 10, wherein the maneuver notification further includes a driving condition indicator based on the at least one driving condition.

14. The method of claim 10, wherein the maneuver notification further includes a descriptor based on the autonomous maneuver.

15. The method of claim 9, wherein the autonomous maneuver includes a lane change.

16. The method of claim 9, wherein controlling the vehicle to perform the autonomous maneuver includes:

controlling, with the electronic processor, at least one vehicle control system of the vehicle to perform the autonomous maneuver.

* * * * *